(12) United States Patent
Lyu

(10) Patent No.: US 11,296,855 B2
(45) Date of Patent: Apr. 5, 2022

(54) COMMUNICATION METHOD, TERMINAL DEVICE, AND NETWORK DEVICE

(71) Applicant: Huawei Technologies Co., Ltd., Shenzhen (CN)

(72) Inventor: Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 16/711,958

(22) Filed: Dec. 12, 2019

(65) Prior Publication Data

US 2020/0145173 A1 May 7, 2020

Related U.S. Application Data

(63) Continuation of application No. PCT/CN2018/088815, filed on May 29, 2018.

(30) Foreign Application Priority Data

Jun. 15, 2017 (CN) .......................... 201710454129.3

(51) Int. Cl.
*H04L 5/10* (2006.01)
*H04L 1/18* (2006.01)
(Continued)

(52) U.S. Cl.
CPC .............. *H04L 5/10* (2013.01); *H04L 1/1858* (2013.01); *H04L 5/0051* (2013.01); *H04W 72/0446* (2013.01); *H04W 72/0453* (2013.01)

(58) Field of Classification Search
CPC ....... H04L 5/10; H04L 1/1858; H04L 5/0051; H04L 5/0007; H04L 5/0064;
(Continued)

(56) References Cited

U.S. PATENT DOCUMENTS

| 10,727,987 B2* | 7/2020 | Sun | ..................... H03M 13/1111 |
| 2018/0270022 A1* | 9/2018 | Sun | ........................ H04L 1/1896 |

(Continued)

FOREIGN PATENT DOCUMENTS

| CN | 105979597 A | 9/2016 |
| CN | 106376050 A | 2/2017 |

(Continued)

OTHER PUBLICATIONS

"Discussion on DL multiplexing of eMBB and URLLC", VIVO, 3GPP TSG RAN WG1 89 Meeting, R1-1707242, May 15-19, 2017, 4 pages, Hangzhou, China.

(Continued)

*Primary Examiner* — Jay P Patel
(74) *Attorney, Agent, or Firm* — Slater Matsil, LLP

(57) ABSTRACT

A communication method, including receiving, by a terminal device, first indication information sent by the network device, where the first indication information indicates a first time-frequency resource used to receive a reference signal of the terminal device, receiving, by the terminal device, second indication information sent by the network device, where the second indication information indicates a second time-frequency resource, and determining, by the terminal device according to the second indication information, whether a third time-frequency resource is included in the first time-frequency resource, where the third time-frequency resource is at least one of a time-frequency resource included in both of the first time-frequency resource and the second time-frequency resource, a time-frequency resource adjacent to the second time-frequency resource, a time-frequency resource whose interval from the second time-frequency resource is less than a preset first interval, or a time-frequency resource related to the second time-frequency resource.

20 Claims, 6 Drawing Sheets

(51) Int. Cl.
*H04L 5/00* (2006.01)
*H04W 72/04* (2009.01)

(58) Field of Classification Search
CPC ... H04L 5/0057; H04L 5/0094; H04L 5/0048; H04L 5/0005; H04W 72/0446; H04W 72/0453; H04W 72/042
See application file for complete search history.

(56) References Cited

U.S. PATENT DOCUMENTS

| 2018/0287745 | A1* | 10/2018 | Sun | H04L 1/1864 |
| 2020/0008216 | A1* | 1/2020 | Iyer | H04W 72/04 |
| 2020/0059327 | A1* | 2/2020 | Kini | H04W 72/042 |
| 2020/0067667 | A1* | 2/2020 | Gou | H04L 1/1812 |
| 2020/0195386 | A1* | 6/2020 | Marinier | H04L 1/1896 |

FOREIGN PATENT DOCUMENTS

| CN | 106788931 A | 5/2017 |
| CN | 106851846 A | 6/2017 |
| WO | 2017014572 A1 | 1/2017 |
| WO | 2018187163 A1 | 10/2018 |
| WO | 2019032844 A1 | 2/2019 |

OTHER PUBLICATIONS

Huawei et al: "On pre-emption indication for DL multiplexing of URLLC and eMBB", 3GPP TSG RAN WG1 Meeting #89, R1-1708124, May 15-May 19, 2017, 10 pages, Hangzhou, China.
Zte et al: "About URLLC and eMBB multiplexing in downlink", 3GPP TSG RAN WG1 AH_NR Meeting, R1-1700264, Jan. 16-20, 2017, 10 pages, Spokane, USA.
Guangdong Oppo Mobile Telecom: "DL control channel design for URLLC", 3GPP TSG RAN WG1 Meeting #88, R1-1701963, Feb. 13-17, 2017 (Feb. 12, 2017), 4 pages, Athens, Greece.

* cited by examiner

COMMUNICATION METHOD, TERMINAL DEVICE, AND NETWORK DEVICE

CROSS-REFERENCE TO RELATED APPLICATIONS

This application is continuation application of International Application No. PCT/CN2018/088815, filed on May 29, 2018, which claims priority to Chinese Patent Application No. 201710454129.3, filed on Jun. 15, 2017. The disclosures of the aforementioned applications are hereby incorporated by reference in their entireties.

TECHNICAL FIELD

This application relates to the communications field, and more specifically, to a communication method, a terminal device, and a network device.

BACKGROUND

A reference signal (RS) is also referred to as a "pilot signal". In a Long Term Evolution (LTE) system, a terminal device directly uses the reference signal after receiving the reference signal on a time-frequency resource used to receive the reference signal, to achieve objectives such as channel estimation, channel detection, or data demodulation.

However, in a $5^{th}$ generation (5G) communications system, there are different types of services, and transmission requirements required by the different types of services are different. To satisfy the transmission requirements of the different types of services, a case of interference or resource preemption may exist. For example, during a process in which a network device transmits data of an enhanced mobile broadband (eMBB) service, data of an ultra-reliable and low latency communications (URLLC) service needs to be transmitted. To satisfy a shorter transmission latency required for transmitting the URLLC service, the network device may transmit the data of the URLLC service on a time-frequency resource that has been allocated and that is used to transmit data of the eMBB service. In this case, the data of the URLLC service is extremely likely to occupy a time-frequency resource that is originally used to transmit the reference signal to a terminal transmitting the eMBB service.

Therefore, if the terminal device directly uses, after receiving a signal on the time-frequency resource used to receive the reference signal, the received signal for channel estimation, channel detection, or data demodulation, reliability of the channel estimation, the channel detection, or the data demodulation is reduced.

SUMMARY

This application provides a communication method, a terminal device, and a network device, and is advantageous to improving reliability of channel estimation, channel detection, or data demodulation performed by a terminal device.

According to a first aspect, a communication method is provided, including receiving, by a terminal device, first indication information sent by a network device, where the first indication information indicates a first time-frequency resource used to receive a reference signal of the terminal device, receiving, by the terminal device, second indication information sent by the network device, where the second indication information indicates a second time-frequency resource, and determining, by the terminal device according to the second indication information, whether a third time-frequency resource is included in the first time-frequency resource, where the third time-frequency resource is a time-frequency resource included in both of the first time-frequency resource and the second time-frequency resource, a time-frequency resource adjacent to the second time-frequency resource, a time-frequency resource whose interval from the second time-frequency resource is less than a preset first interval, or a time-frequency resource related to the second time-frequency resource.

In this embodiment of this application, the second indication information is sent to the terminal device to enable the terminal device to determine whether the third time-frequency resource exists, where the third time-frequency resource is likely to be a time-frequency resource that is originally used to receive the reference signal but has an exception, so that the terminal device further determines whether to use a signal received on the third time-frequency resource, thereby avoiding a case in which the terminal device directly uses a signal as a reference signal in the prior art, where the signal is received on a time-frequency resource used to receive a reference signal, from reducing precision of channel estimation or channel detection or resulting in a data demodulation failure.

With reference to the first aspect, in a possible implementation of the first aspect, the second indication information is further used to indicate that a signal on the second time-frequency resource is unavailable, and/or the second indication information is further used to indicate a retransmitted code block or a retransmitted code block group (CBG), and in a previous transmission of the retransmitted code block or the retransmitted CBG, the second time-frequency resource is occupied.

With reference to the first aspect, in a possible implementation of the first aspect, the reference signal is used by the terminal device to determine channel state information, and the method further includes skipping, by the terminal device, sending the channel state information to the network device when the third time-frequency resource is included in the first time-frequency resource, sending, by the terminal device, the channel state information and third indication information to the network device when the third time-frequency resource is included in the first time-frequency resource, where the third indication information indicates that the channel state information is invalid, skipping, by the terminal device, sending the channel state information to the network device when a ratio of the third time-frequency resource to the first time-frequency resource reaches or exceeds a first threshold, or sending, by the terminal device, the channel state information and third indication information to the network device when a ratio of the third time-frequency resource to the first time-frequency resource reaches or exceeds a first threshold, where the third indication information indicates that the channel state information is invalid.

With reference to the first aspect, in a possible implementation of the first aspect, the reference signal is used by the terminal device to determine channel state information, and the method further includes sending, by the terminal device, the channel state information to the network device when a ratio of the third time-frequency resource to the first time-frequency resource does not reach or exceed a first threshold, where the channel state information is obtained by using at least a part in the first time-frequency resource other than the third time-frequency resource, or sending, by the terminal device, the channel state information to the network device, where the channel state information is obtained by using at least a part in the first time-frequency resource other than the third time-frequency resource.

With reference to the first aspect, in a possible implementation of the first aspect, the channel state information is related to a first frequency domain resource, and the first frequency domain resource is less than or equal to a system bandwidth.

With reference to the first aspect, in a possible implementation of the first aspect, the reference signal is used by the terminal device to demodulate at least one information block, and the method further includes when the third time-frequency resource is included in the first time-frequency resource, demodulating, by the terminal device, the at least one information block without using a signal on the third time-frequency resource or skipping demodulating the at least one information block, skipping, by the terminal device, demodulating the at least one information block when a ratio of the third time-frequency resource to the first time-frequency resource reaches or exceeds a second threshold, and/or when a ratio of the third time-frequency resource to the first time-frequency resource does not reach or exceed a second threshold, demodulating, by the terminal device, the at least one information block by using a signal on at least a part of a time-frequency resource in the first time-frequency resource other than the third time-frequency resource.

With reference to the first aspect, in a possible implementation of the first aspect, the reference signal only includes a first demodulation reference signal, or the reference signal includes a first demodulation reference signal and a second demodulation reference signal, where the first demodulation reference signal is a basic demodulation reference signal used to demodulate the at least one information block, and the second demodulation reference signal is an additional demodulation reference signal used to demodulate the at least one information block.

With reference to the first aspect, in a possible implementation of the first aspect, the reference signal is used by the terminal device to demodulate at least one information block, and the reference signal includes a first demodulation reference signal and a second demodulation reference signal, where the first demodulation reference signal is a basic demodulation reference signal used to demodulate the at least one information block, the second demodulation reference signal is an additional demodulation reference signal used to demodulate the at least one information block, the first demodulation reference signal occupies a first part of the first time-frequency resource, and the second demodulation reference signal occupies a second part of the first time-frequency resource, and the method further includes when the third time-frequency resource is included in the first part, demodulating, by the terminal device, the at least one information block without using a signal on the third time-frequency resource or skipping demodulating the at least one information block, skipping, by the terminal device, demodulating the at least one information block when a ratio of a first intersection set between the third time-frequency resource and the first part to the first part reaches or exceeds a third threshold, when a ratio of a first intersection set between the third time-frequency resource and the first part to the first part does not reach or exceed a third threshold, demodulating, by the terminal device, the at least one information block by using a signal on at least a part of a time-frequency resource in the first part other than the first intersection set, when the third time-frequency resource is included in the second part, demodulating, by the terminal device, the at least one information block without using a signal on the third time-frequency resource or skipping demodulating the at least one information block, when a ratio of a second intersection set between the third time-frequency resource and the second part to the second part reaches or exceeds a fourth threshold, demodulating, by the terminal device, the at least one information block without using the second demodulation reference signal, and/or when a ratio of a second intersection set between the third time-frequency resource and the second part to the second part does not reach or exceed a fourth threshold, demodulating, by the terminal device, the at least one information block by using a signal on at least a part of a time-frequency resource in the second part other than the second intersection set.

With reference to the first aspect, in a possible implementation of the first aspect, the reference signal is used to calculate a phase error, and the method further includes calculating, by the terminal device, the phase error without using the reference signal, calculating, by the terminal device, the phase error without using the reference signal when a ratio of the third time-frequency resource to the first time-frequency resource exceeds a fifth threshold, or calculating, by the terminal device, the phase error by using the reference signal when a ratio of the third time-frequency resource to the first time-frequency resource does not exceed or reach a fifth threshold.

With reference to the first aspect, in a possible implementation of the first aspect, at least one threshold in the first threshold, the second threshold, the third threshold, the fourth threshold, and the fifth threshold may be predefined by a communications standard, protocol, or specification or configured by the network device for the terminal device through signaling. When the network device performs configuration for the terminal device through signaling, the network device may perform configuration for the terminal device through physical-layer control signaling, media access control (MAC)-layer signaling, or radio resource control (RRC)-layer signaling.

According to a second aspect, a communication method is provided, including sending, by a network device, first indication information to a terminal device, where the first indication information indicates a first time-frequency resource used to transmit a reference signal of the terminal device, sending, by the network device, second indication information to the terminal device, where the second indication information indicates a second time-frequency resource, the second indication information is further used to determine whether a third time-frequency resource is included in the first time-frequency resource, and the third time-frequency resource is a time-frequency resource included in both of the first time-frequency resource and the second time-frequency resource, a time-frequency resource adjacent to the second time-frequency resource, a time-frequency resource whose interval from the second time-frequency resource is less than a preset first interval, or a time-frequency resource related to the second time-frequency resource.

In this embodiment of this application, the second indication information is sent to the terminal device to enable the terminal device to determine whether the third time-frequency resource exists, where the third time-frequency resource is likely to be a time-frequency resource that is originally used to transmit the reference signal but has an exception, so that the terminal device further determines whether to use a signal received on the third time-frequency resource, thereby avoiding a case in which the terminal device directly uses a signal as a reference signal in the prior art, where the signal is received on a time-frequency resource used to transmit a reference signal, from reducing precision of channel estimation or channel detection or resulting in a data demodulation failure.

With reference to the second aspect, in a possible implementation of the second aspect, the second indication information is further used to indicate that a signal on the second time-frequency resource is unavailable, and/or the second indication information is further used to indicate a retransmitted code block or a retransmitted code block group (CBG), and in a previous transmission of the retransmitted code block or the retransmitted CBG, the second time-frequency resource is occupied.

With reference to the second aspect, in a possible implementation of the second aspect, the reference signal is used by the terminal device to determine channel state information, and the method further includes when the third time-frequency resource is included in the first time-frequency resource, receiving, by the network device, the channel state information and third indication information that are sent by the terminal device, where the third indication information indicates that the channel state information is invalid, or when a ratio of the third time-frequency resource to the first time-frequency resource reaches or exceeds a first threshold, receiving, by the network device, the channel state information and third indication information that are sent by the terminal device, where the third indication information indicates that the channel state information is invalid.

With reference to the second aspect, in a possible implementation of the second aspect, the reference signal is used by the terminal device to determine channel state information, and the method further includes when a ratio of the third time-frequency resource to the first time-frequency resource does not reach or exceed a first threshold, receiving, by the network device, the channel state information sent by the terminal device, where the channel state information is obtained by using at least a part in the first time-frequency resource other than the third time-frequency resource, or receiving, by the network device, the channel state information sent by the terminal device, where the channel state information is obtained by using at least a part in the first time-frequency resource other than the third time-frequency resource.

With reference to the second aspect, in a possible implementation of the second aspect, the channel state information is related to the first frequency domain resource, and the first frequency domain resource is less than or equal to a system bandwidth.

With reference to the second aspect, in a possible implementation of the second aspect, the first threshold may be predefined by a communications standard, protocol, or specification or configured by the network device for the terminal device through signaling. When the network device performs configuration for the terminal device through signaling, the network device may perform configuration for the terminal device through physical-layer control signaling, MAC-layer signaling, or RRC-layer signaling.

According to a third aspect, a terminal device is provided, including modules for performing the first aspect.

According to a fourth aspect, a network device is provided, including modules for performing the second aspect.

According to a fifth aspect, a terminal device is provided, including a transceiver, a processor, and a memory. The processor is configured to control the transceiver to send and receive a signal, the memory is configured to store a computer program, and the processor is configured to invoke, from the memory, and run the computer program, to enable the terminal device to perform the method according to the first aspect.

According to a sixth aspect, a network device is provided, including a transceiver, a processor, and a memory. The processor is configured to control the transceiver to send and receive a signal, the memory is configured to store a computer program, and the processor is configured to invoke, from the memory, and run the computer program, to enable the network device to perform the method according to the second aspect.

According to a seventh aspect, a computer program product is provided, including computer program code, when being run, the computer program code is used to perform the methods according to the foregoing aspects.

According to an eighth aspect, a computer-readable medium is provided, storing program code, where the program code includes an instruction used to perform the methods according to the foregoing aspects.

According to a ninth aspect, a chip is provided, including a processor and a memory, where the processor is configured to perform the methods according to the foregoing aspects.

DETAILED DESCRIPTION OF ILLUSTRATIVE EMBODIMENTS

The following describes technical solutions of this application with reference to accompanying drawings.

Figure 1:
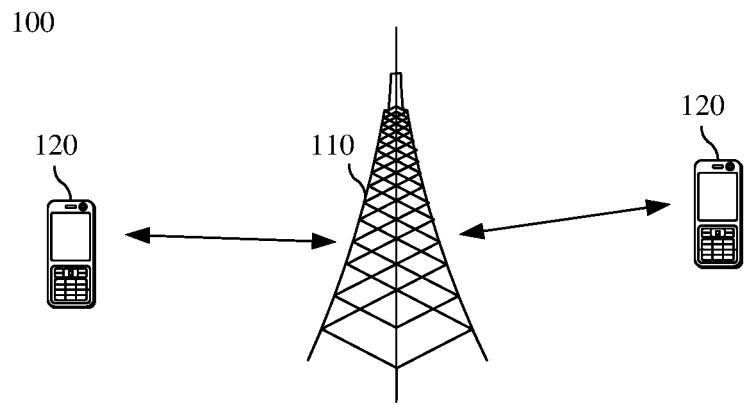
FIG. 1 shows a wireless communications system 100 to which an embodiment of this application is applied.

FIG. 1 shows a wireless communications system 100 to which an embodiment of this application is applied. The wireless communications system 100 may include a network device 110. The network device 110 may be a device communicating with a terminal device. The network device 110 may provide communication coverage for a specific geographical area, and may communicate with a terminal device 120 located in the coverage area.

FIG. 1 shows one network device and two terminals as an example. Optionally, the wireless communications system 100 may include a plurality of network devices, and another quantity of terminals may be included in a coverage area of each network device. This is not limited in this embodiment of this application.

Optionally, the wireless communications system 100 may further include another network entity such as a network controller and a mobility management entity. This is not limited in the embodiments of this application.

It should be understood that the technical solutions of this application may be applied to various communications systems, such as a global system for mobile communication (GSM) system, a code division multiple access (CDMA) system, a wideband code division multiple access (WCDMA) system, a general packet radio service (GPRS), a Long Term Evolution (LTE) system, a Long Term Evolution Advanced (LTE-A) system, a universal mobile telecommunication system (UMTS), a new radio (New Radio Access Technology, NR), and a 5G system.

It should further be understood that in the embodiments of this application, a terminal device may include but is not limited to a mobile station (MS), a mobile terminal, a mobile telephone, user equipment (UE), a handset, portable equipment, and the like. The terminal device may communicate with one or more core networks by using a radio access network (RAN). For example, the terminal device may be a mobile telephone (or referred to as a "cellular" telephone), or a computer having a wireless communication function, and the user equipment may further be a portable, pocket-sized, handheld, computer built-in, or in-vehicle mobile apparatus.

In the embodiments of this application, the network device may be a network device, such as a base station, a transmit and receive point (TRP), or an access point, the base station may be a base transceiver station (BTS) in GSM or CDMA, a NodeB in WCDMA, an evolved NodeB (eNB or e-NodeB) in LTE, or a base station (gNB) of NR or 5G. This is not specifically limited in the embodiments of this application.

For ease of understanding, a communication scenario to which the communication method in the embodiments of this application is applicable is briefly described with reference to the communications system as shown in FIG. 1. It should be understood that the following scenarios are merely specific scenarios listed for convenient understanding of the communication method of the embodiments of this application, and a communication scenario to which the communication method of the embodiments of this application is applicable is not specifically limited in the embodiments of this application.

Scenario 1: A time-frequency resource used to transmit a reference signal is preempted.

Typical URLLC services usually include tactile interactive applications such as wireless control in an industrial manufacturing or producing process, motion control on a driverless vehicle and a pilotless plane, remote fixing, and remote operation. Main features of the services are requirements for ultra-high reliability and a relatively low latency. Packets of the URLLC services are usually small packets (which, for example, are 32, 50, and 200 bytes, and the like), and the packets of the URLLC services are generated suddenly and randomly. Possibly, no packet is generated in a long time, or a plurality of packets are generated in a very short time. To satisfy transmission characteristics of the URLLC services, in a communications system, a shorter time scheduling unit may be used to schedule the packets of the URLLC services. For example, a symbol, a mini-slot (mini-slot), or a slot having a larger subcarrier spacing may be used as a minimum time scheduling unit.

Typical eMBB services include web page browsing, data transmission, video broadcasting, an ultra-high definition video, and the like. Main features of the services are a large volume of transmitted data and a high transmission rate. Therefore, a relatively long time scheduling unit is usually used to transmit data, to improve transmission efficiency. For example, a slot having a subcarrier spacing of 15 kHz is used to correspond to 7 time domain symbols, and a corresponding time length is 0.5 ms. For data of the URLLC services, a relatively short time scheduling unit is usually used to satisfy a requirement for an ultra-short latency. For example, two time domain symbols having a subcarrier spacing of 15 kHz or one slot having a subcarrier spacing of 60 kHz are used to correspond to 7 time domain symbols, and a corresponding time length is 0.125 ms.

Because the data of the URLLC services is generated suddenly and randomly, to improve a utilization ratio of system resources, in a downlink transmission process, the network device usually does not reserve a specific time-frequency resource for the data of the URLLC service. When there is to-be-sent data of a URLLC service in the network device, to satisfy a relatively short transmission latency required for transmitting the data of the URLLC service, the network device cannot wait to transmit the data of the URLLC service after transmission of the data of the eMBB service scheduled this time is completed. The network device usually allocates the time-frequency resources for the data of the URLLC service in a resource preemption manner.

Figure 2:
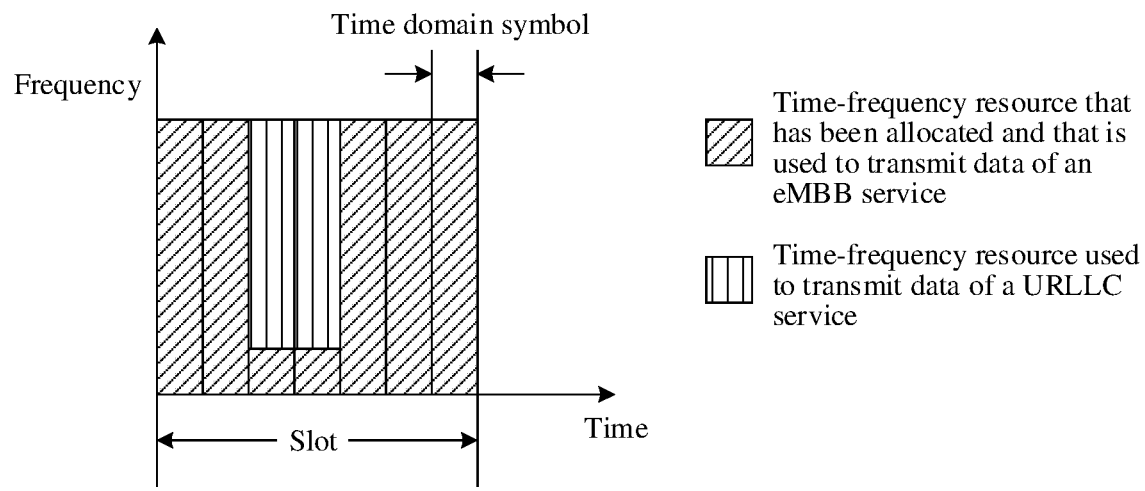
FIG. 2 is a schematic diagram of a case in which data of a URLLC service preempts a time-frequency resource used to transmit data of an eMBB service.

FIG. 2 is a schematic diagram of a case in which data of a URLLC service preempts a time-frequency resource used to transmit data of an eMBB service. It can be learned from the schematic diagram of the time-frequency resource as shown in FIG. 2 that the network device selects some or all time-frequency resources in the time-frequency resources that have been allocated and that are used to transmit the data of the eMBB service for transmitting the data of the URLLC service. In this case, the network device may not send the data of the eMBB service on time-frequency resource preempted by the data of the URLLC service.

In addition, because of a relatively low latency and relatively high reliability required for transmitting the URLLC service, the network device may select a most suitable frequency domain resource for the URLLC service, to ensure reliability of the URLLC service. In this case, there may be more than one terminal device (which may be a terminal device transmitting the data of the eMBB service, and for ease of description, is referred to as "an eBMM terminal device" for short below) whose time-frequency resource is preempted by the URLLC service. In addition, a ratio of a quantity of time-frequency resources that are preempted by the URLLC service and that are of the different eMBB terminal devices to a quantity of total time-frequency resources that are allocated by the network device for the terminal device may also be different.

When a system load is light, the network device may avoid, when preempting the time-frequency resource for the data of the URLLC service, the time-frequency resource used to transmit the data of the eMBB service as much as possible, or at least avoid a transmission resource of an important signal (such as a reference signal) when transmitting the eMBB service. However, when a system load is relatively heavy, it is difficult for the network device to specifically avoid, when preempting the time-frequency resource for the data of the URLLC service, the time-frequency resource used to transmit the reference signal in a process of transmitting the data of the eMBB service. In this case, if the eMBB terminal device directly uses a signal received on the preempted time-frequency resource for channel estimation, channel detection, or data demodulation, to some extent, precision of channel estimation or channel detection may be reduced or a data demodulation failure may be resulted in.

Scenario 2: The time-frequency resource used to transmit the signal (such as the reference signal or a data signal) is blanked.

After allocating the time-frequency resource for the terminal device to transmit the reference signal, the network device may decide to complete another operation by using the time-frequency resource, such as measuring interference of an adjacent cell on the time-frequency resource. Finally, the time-frequency resource that is originally used to transmit the reference signal is blanked. To be specific, the network device neither transmits the signal nor transmits another signal on the time-frequency resource that is originally appointed to transmit the signal.

In this case, the terminal device still receives the signal on the blanked time-frequency resource to perform a meaningless terminal behavior.

Scenario 3: A signal and another signal are transmitted on the time-frequency resource used to transmit the signal (such as a reference signal or a data signal).

1. When the another signal is a "useful signal" to the terminal device, that is, the signal and the another signal are transmitted at the same time on the time-frequency resource used to transmit the signal to the terminal device (which can be understood as multiplexing the time-frequency resource used to transmit the signal).

It should be understood that a network device sending the another signal and a network device sending the signal may be a same network device or different network devices, or a transmit end of the another signal may be another terminal device.

It should further be understood that different signal features may be used for the signal and the another signal, for example, the signal and the another signal are sent in different modulation manners, or the signal and the another signal may be sent through different beams, so that the terminal device can distinguish the signal and the another signal on the time-frequency resource used to transmit the signal.

In this case, if the terminal device still only receives the signal on the time-frequency resource used to transmit the signal, "the useful signal", that is, reception of the another signal, may be omitted.

2. When the another signal is an interfering signal to the terminal device, and an interference degree of the interfering signal on the signal is relatively high, for example, a transmit power of the interfering signal is large, reception reliability of the signal may be affected.

If the signal is the reference signal, in this case, if the terminal device still directly uses the received "unreliable" reference signal, precision of channel estimation or channel detection may be reduced, or a data demodulation failure may be resulted in. If the signal is a data signal, and the terminal device still directly uses the received "unreliable" data signal, probability of correctly decoding the data signal may be reduced.

Figure 3:
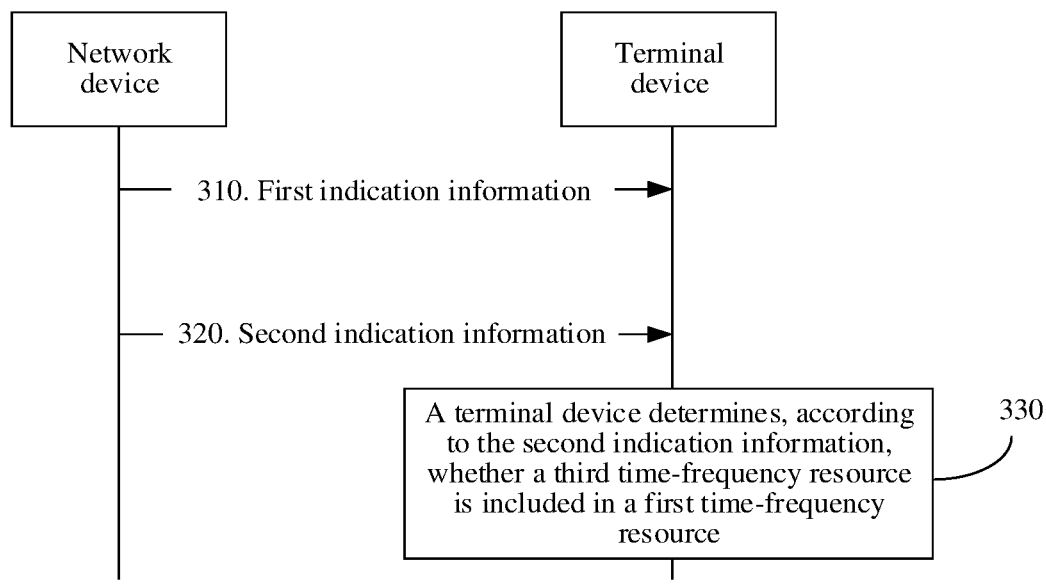
FIG. 3 is a schematic flowchart of a communication method according to an embodiment of this application.

To resolve problems in the foregoing different communication scenarios to some extent, the following describes the communication method in the embodiments of this application in detail with reference to FIG. 3.

FIG. 3 is a schematic flowchart of a communication method according to an embodiment of this application form the perspective of device interaction. It should be understood that FIG. 3 shows communication steps or operations of the communication method of this embodiment of this application, but the steps or operations are merely examples. In this embodiment of this application, other operations or various variants of the operations in FIG. 3 may be further performed. In addition, the steps in FIG. 3 may be performed in a sequence different from that presented in FIG. 3, and possibly, not all the operations in FIG. 3 need to be performed.

310. A network device sends first indication information to a terminal device, where the first indication information indicates a first time-frequency resource used to transmit a reference signal of the terminal device.

Specifically, the first time-frequency resource may be all or some time-frequency resources that are used to transmit the reference signal of the terminal device. For example, the first time-frequency resource may be a time-frequency resource used to transmit a same type of reference signal. For another example, a communications system is a multiple-antenna system, a same type of reference signal corresponds to a plurality of ports, and the first time-frequency resource may further be a time-frequency resource used to transmit a reference signal of a same port.

The reference signal may be at least one of the following reference signals a channel state information-reference signal (Channel State Information-Reference Signal, CSIRS), a demodulation reference signal (Demodulation Reference Signal, DMRS), a phase-tracking reference signal (Phase-tracking reference signal, PTRS), and the like.

The CSIRS is used by the terminal device to measure at least one type of channel state information, and the CSIRS may alternatively be a reference signal used to measure interference, for example, a channel state information-interference measurement (CSI-interference measurement, CSI-IM) reference signal. The CSIRS may alternatively be a zero-power reference signal, that is, the network device does not send a signal, such as a zero-power channel state information-reference signal (Zero-power CSI-RS, ZP CSIRS), at a location of a time-frequency resource corresponding to the zero-power reference signal. The CSIRS may alternatively be a reference signal used to measure lobe quality, for example, a beam state information reference signal (BSIRS).

The DMRS is used by the terminal device to demodulate data and/or control information. Specifically, the demodulating may include performing channel estimation based on the DMRS and demodulating (or constellation de-mapping and the like) a received signal of the data and/or control information by using the channel estimation, and may further include performing decoding and the like based on the demodulated signal.

The PTRS is used by the terminal device to estimate phase noise (or a phase error, a phase deviation, or the like) in the received signal. Further, the terminal device may further process the phase noise in the received signal by using a result of the estimation, for example, correct or compensate for the phase noise, and the like.

It should be noted that in addition to the foregoing reference signals in an existing communications system, the reference signal may alternatively be a signal having a same function as the foregoing reference signals in a future communications system.

For different types of reference signals, specific representation forms of the foregoing first indication information are different.

When the reference signal is a CSI-RS, the first indication information may be configuration information that instructs the terminal device to report the channel state information and that is carried in radio resource control (RRC) signaling, where the configuration information is used to instruct the terminal device how to report the channel state information, for example, content for reporting the channel state information and timing for reporting the channel state information, and the terminal device may determine, based on the configuration information, a location of a time-frequency resource at which the CSI-RS signal used to determine the channel state information is located. The first indication information may alternatively be downlink control information (DCI) instructing the terminal device to report the channel state information one-time. The first indication information may alternatively be information, such as a location of a time unit in which the CSI-RS is located, a time-frequency pattern, and the like, that is carried by an RRC signaling and that is used to configure a location of the time-frequency resource at which the CSI-RS of the terminal device is located.

When the foregoing reference signal is a DMRS, the first indication information may be DCI, where the DCI is used to schedule transmission of data, and the terminal device determines, based on the DCI that is used to schedule the data transmission, a first time-frequency resource at which the DMRS is located and that is used to demodulate the data.

It should be noted that if some or all DMRSs that are used to demodulate the data are further configured to demodulate the first indication information, the terminal device may determine that the DMRS exists based on the existence of the first indication information after determining that the first indication information is sent, and further determine the first time-frequency resource, or the terminal device determines that the DMRS is carried on the first time-frequency resource based on the existence of the first indication information.

When the reference signal is a PTRS, the first indication information may be configuration information of RRC signaling, where the configuration information is used to configure a time-frequency resource used to transmit the PT-RS, or the configuration information is used to configure a sending timing for transmitting the PT-RS and a sending location for transmitting the PT-RS, or the first indication information may further be indication information in the DCI, where the indication information indicates that the PT-RS is carried in a data signal that is scheduled and transmitted based on the DCI.

320. The network device sends second indication information to the terminal device, where the second indication information indicates a second time-frequency resource.

Optionally, the second indication information is further used to indicate that a signal on the second time-frequency resource is unavailable, and/or the second indication information is further used to indicate a retransmitted code block or a retransmitted code block group (CBG). In a previous transmission of the retransmitted code block or the retransmitted CBG, the second time-frequency resource is occupied.

Specifically, the second indication information is further used to indicate that a signal on the second time-frequency resource is unavailable. That the signal on the second time-frequency resource is unavailable may indicate that an exception occurs in the second time-frequency resource, that the signal transmitted on the second time-frequency resource needs to be specially processed, or the like. That the signal on the second time-frequency resource is unavailable may alternatively indicate that a signal originally scheduled for transmission on the second time-frequency resource is not sent on the second time-frequency resource, but another signal is sent. Alternatively, that the signal on the second time-frequency resource is unavailable may indicate that neither a signal originally scheduled for transmission on the second time-frequency resource nor another signal is sent on the second time-frequency resource. Alternatively, that the signal on the second time-frequency resource is unavailable indicates that an originally scheduled signal is sent on the second time-frequency resource, and another signal is also sent on the second time-frequency resource at the same time, where the another signal may be a signal that is useful to the terminal device or an interfering signal.

It should be noted that the foregoing "signal originally scheduled for transmission on the second time-frequency resource" may indicate a signal transmitted on the second time-frequency resource that the network device has indicated to the terminal device through (physical-layer, RRC-layer, or multimedia control-layer) signaling in front of a time-frequency location at which the second time-frequency resource is located. The foregoing "signal originally scheduled for transmission on" may further indicate a signal transmitted on the second time-frequency resource as predefined by a communication standard or specification.

The second indication information may alternatively be resource indication information. To be specific, the second indication information may directly indicate a time-frequency resource whose signal is unavailable.

For example, the second indication information may indicate the second time-frequency resource by using a bitmap file when the second indication information is used as resource indication information. To be specific, different time-frequency resources (such as resource elements (REs)) may correspond to different bits and indicate the second time-frequency resource through values of the different bits. The foregoing second indication information may further indicate the second time-frequency resource by using a field including N bits, and may indicate the second time-frequency resource by using M states of the N bits, where $M \leq 2^N$.

The second indication information is further used to indicate the retransmitted code block or the retransmitted code block group (CBG), or the second indication information may alternatively be indication information used to indicate the retransmitted code block or the retransmitted code block group (CBG) in a previous transmission (for example, a last transmission) of the retransmitted code block or the retransmitted CBG, the second time-frequency resource is occupied. It may be understood that at least a part of the time-frequency resource occupied by the retransmitted code block or the retransmitted CBG that is indicated by the second indication information in a previous transmission process is used to transmit another signal, at least a part of the time-frequency resource occupied by the retransmitted code block or the retransmitted CBG that is indicated by the second indication information in a previous transmission process is blanked, or at least a part of the time-frequency resource occupied by the retransmitted code block or the retransmitted CBG that is indicated by the second indication information in a previous transmission process is interfered.

Further, the terminal device further receives second control information from the network device. The second control information includes the foregoing second indication information. The second control information is further used to schedule transmission of the retransmitted code block or the retransmitted code block group (CBG) that are indicated by the second indication information.

It should be understood that the code block may be formed by division of one or more information blocks that are actually transmitted when the network device schedules the terminal device to perform physical-layer data transmission, and one code block group includes at least one code block. The information block may be a transport block, a code block, or a code block group.

It should be noted that the second indication information may be sent specifically to the terminal device, and may be sent to a terminal device set in which the terminal device is located, for example, sent to the terminal device in a multicast manner.

330. The terminal device determines, according to the second indication information, whether a third time-frequency resource is included in the first time-frequency resource, where the third time-frequency resource is a time-frequency resource included in both of the first time-frequency resource and the second time-frequency resource, a time-frequency resource adjacent to the second time-frequency resource, a time-frequency resource whose interval from the second time-frequency resource is less than a preset first interval, or a time-frequency resource related to the second time-frequency resource.

Specifically, if the second indication information is used as the resource indication information mentioned above, the second time-frequency resource indicated by the second indication information and the third time-frequency resource may be a same time-frequency resource, the third time-frequency resource is a subset of the second time-frequency resource, or the third time-frequency resource is empty. The terminal device may determine, based on whether an intersection set between the first time-frequency resource and the second time-frequency resource exists, whether the third time-frequency resource is included in the first time-frequency resource. If the intersection set between the first time-frequency resource and the second time-frequency resource exists, the terminal device determines that the third time-frequency resource is included in the first time-frequency resource, and the third time-frequency resource is the intersection set between the first time-frequency resource and the second time-frequency resource, in other words, the third time-frequency resource is the time-frequency resource included in both of the first time-frequency resource and the second time-frequency resource.

If the second indication information indicates the retransmitted code block or the retransmitted CBG, the terminal device may determine whether the third time-frequency resource is included in the first time-frequency resource by using at least one of following methods.

If the third time-frequency resource is included in the second time-frequency resource indicated by the second indication information, the second time-frequency resource is adjacent to the third time-frequency resource, an interval between the second time-frequency resource and the third time-frequency resource is less than a preset first interval, or the second time-frequency resource is related to the third second time-frequency resource, the terminal device may determine that the third time-frequency resource is included in the first time-frequency resource.

It should be understood that the second time-frequency resource is related to the third time-frequency resource. Alternatively, a reference signal transmitted on the third time-frequency resource is used to demodulate at least a part of data transmitted on the second time-frequency resource.

It should further be understood that the third time-frequency resource may be the first time-frequency resource, or the third time-frequency resource belongs to the first time-frequency resource.

Figure 4:
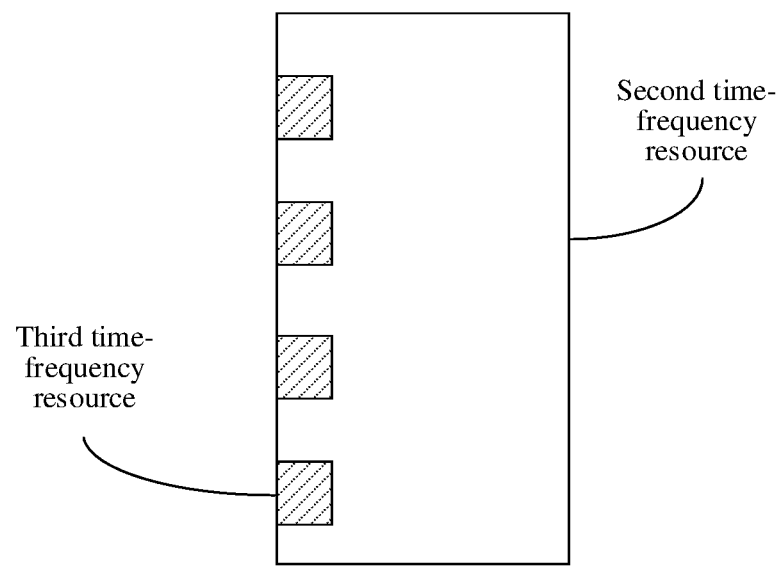
FIG. 4 is a schematic structural diagram of a location relationship between a second time-frequency resource and a third time-frequency resource according to an embodiment of this application.
Figure 5:
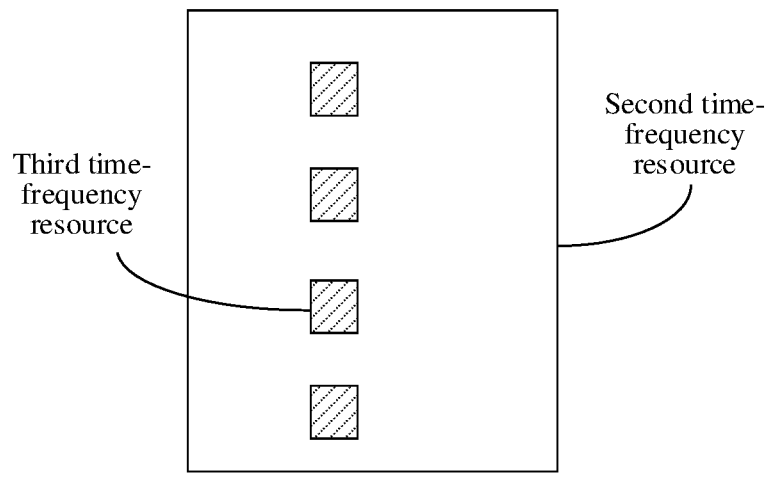
FIG. 5 is a schematic structural diagram of a location relationship between a second time-frequency resource and a third time-frequency resource according to an embodiment of this application.

For example, relative locations of the third time-frequency resource and the second time-frequency resource are described with reference to FIG. 4 and FIG. 5. FIG. 4 and FIG. 5 are schematic structural diagrams of a location relationship between a second time-frequency resource and a third time-frequency resource according to an embodiment of this application. In FIG. 4 and FIG. 5, there are two cases for relative locations of the second time-frequency resource and the third time-frequency resource.

Case 1. When second indication information indicates to transmit a retransmitted code block or a code block group, to further indicate to transmit a time-frequency resource of the retransmitted code block or the code block group, the second time-frequency resource and the third time-frequency resource shown in FIG. 4 and FIG. 5 are adjacent to each other.

The terminal device may determine, according to the second indication information, that the second time-frequency resource used to receive a target code block is re-allocated by a network device in a process of preparing to receive the target code block for the first time, to transmit data of a URLLC service by the network. Therefore, the target code block needs to be retransmitted. To be specific, the retransmitted target code block is the code block retransmitted above. Because the network device usually preempts a plurality of consecutive time-frequency resources and the second time-frequency resource surrounds the third time-frequency resource that is originally used to transmit a reference signal when re-allocating (preempting) the time-frequency resources for transmitting data of the URLLC service. Therefore, the terminal device may determine that the third time-frequency resource is greatly likely to be preempted by the network device to transmit the data of the URLLC service. Therefore, a signal on the third time-frequency resource is unavailable in a previous process of transmitting the target code block (or in a scheduled process of transmitting the target code block by using the second time-frequency resource).

Case 2. When second indication information indicates to transmit a retransmitted code block or a code block group, to further indicate consecutive time-frequency resource areas in which a time-frequency resource used to transmit the retransmitted code block or the code block group is located, the second time-frequency resource and the third time-frequency resource shown in FIG. 4 and FIG. 5 are adjacent to each other.

The terminal device may determine, according to the second indication information, that in a process of preparing to receive the target code block for the first time, the second time-frequency resource used to receive a target code block is preempted by a network device to transmit data of the URLLC service. Therefore, the target code block needs to be retransmitted. To be specific, the retransmitted target code block is the code block retransmitted above. Because the third time-frequency resource that is originally used to transmit the reference signal is included in the second time-frequency resource, the terminal device may determine that the third time-frequency resource is preempted by the network device to transmit data of the URLLC service. Therefore, a signal on the third time-frequency resource is unavailable in a previous process of receiving the target code block (or in a scheduled process of receiving the target code block by using the second time-frequency resource).

Figure 6:
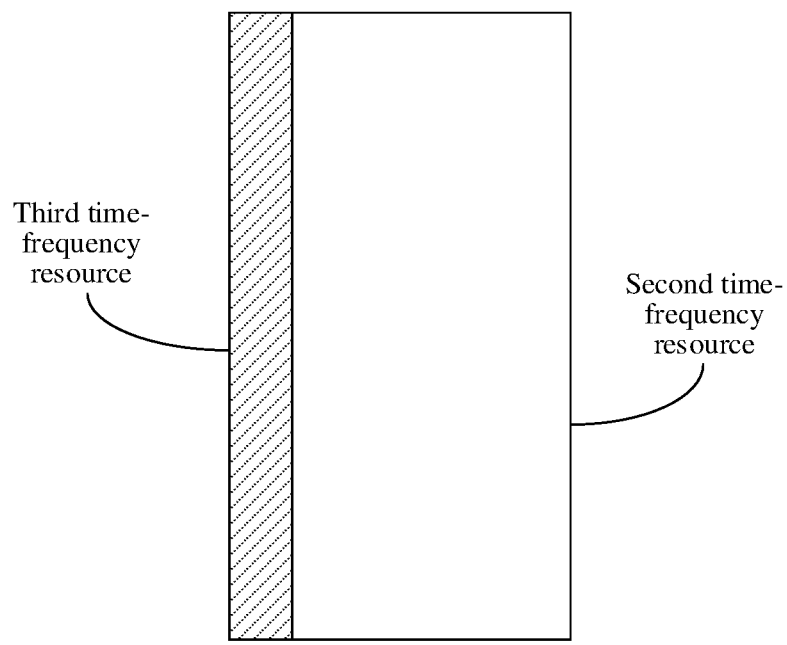
FIG. 6 is a schematic structural diagram of a location relationship between a second time-frequency resource and a third time-frequency resource according to an embodiment of this application.

For another example, a case in which the second time-frequency resource is adjacent to the third time-frequency resource is described with reference to FIG. 6. FIG. 6 is a schematic structural diagram of a location relationship between a second time-frequency resource and a third time-frequency resource according to an embodiment of this application. The terminal device may determine, according to second indication information, that a second time-frequency resource used to receive a target code block is preempted by a network device in a process of preparing to receive the target code block for the first time, to transmit data of a URLLC service. Because the third time-frequency resource that is originally used to receive the reference signal is adjacent to the second time-frequency resource, the terminal device may determine that the third time-frequency resource is preempted by the network device and a probability of transmitting data of the URLLC service by using third time-frequency resource is relatively high. Therefore, a signal on the third time-frequency resource is unavailable in a process of receiving the target code block for the first time.

It should be understood that the foregoing term "adjacent to" refers to a RE in the third time-frequency resource, and at least one of the REs adjacent to the RE in the third time-frequency resource belongs to the second time-frequency resource.

Figure 7:
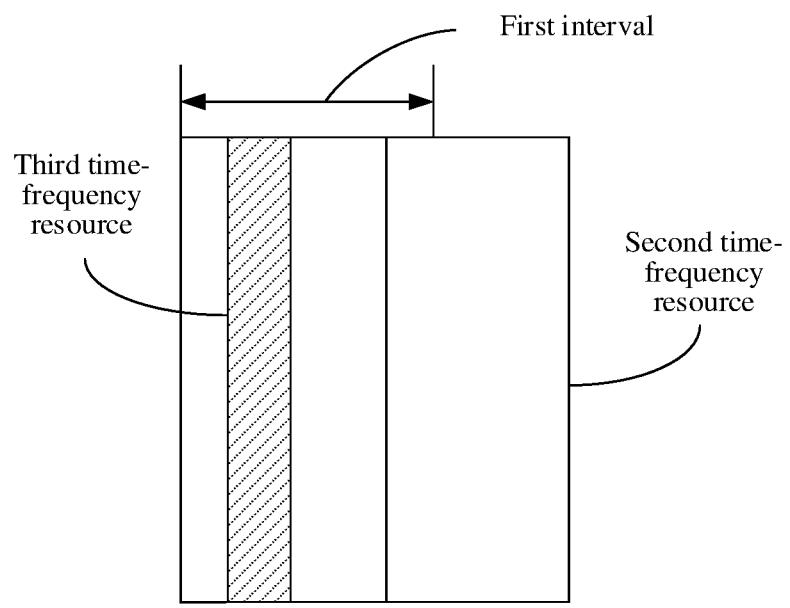
FIG. 7 is a schematic structural diagram of a location relationship between a second time-frequency resource and a third time-frequency resource according to an embodiment of this application.

For another example, a case in which an interval between the second time-frequency resource and the third time-frequency resource is less than a preset first interval is described with reference to FIG. 7. FIG. 7 is a schematic structural diagram of a location relationship between a second time-frequency resource and a third time-frequency resource according to an embodiment of this application. A terminal device may determine, according to second indication information, that a second time-frequency resource used to receive a target code block is preempted by a network device in a process of preparing to receive the target code block for the first time, to transmit data of the URLLC service. Because the network device usually preempts a plurality of consecutive time-frequency resources when preempting time-frequency resources for transmitting data of the URLLC service, referring to a second time-frequency resource and a third time-frequency resource whose time-frequency resource interval is less than a first interval in FIG. 7, when the second indication information indicates the second time-frequency resource in FIG. 7, a third time-frequency resource whose interval from the second time-frequency resource is a less than a preset first interval is also extremely likely to be preempted by the network device to transmit data of the URLLC service. Therefore, a signal transmitted on the third time-frequency resource is unavailable in a process of receiving the target code block for the first time.

It should be noted that a case in which a signal on the third time-frequency resource is unavailable may indicate that the data of the URLLC service is transmitted on the third time-frequency resource, or interference of the data of the URLLC service on a reference signal transmitted on the third time-frequency resource is large.

In this embodiment of this application, the second indication information is sent to the terminal device to enable the terminal device to determine whether the third time-frequency resource exists, where the third time-frequency resource is likely to be a time-frequency resource that is originally used to receive the reference signal but has an exception, so that the terminal device further determines whether to use a signal received on the third time-frequency resource, thereby avoiding a case in which the terminal device directly uses a signal as a reference signal in the prior art, where the signal is received on a time-frequency resource used to receive a reference signal, from reducing precision of channel estimation or channel detection or resulting in a data demodulation failure.

Optionally, in an embodiment, the method further includes receiving, by the terminal device, a first signal on a time-frequency resource used to receive the reference signal, determining, by the terminal device according to the second indication information, that an interfering signal and the reference signal are included in the first signal, determining, by the terminal device according to the second indication information, the first signal as the interfering signal, and processing, by the terminal device, the reference signal according to the second indication information, where the processing includes determining that an effect of the reference signal is invalid or continuing to use the reference signal.

Optionally, in an embodiment, the second indication information indicates that a reference signal and a second signal are included in a signal on the third time-frequency resource, and the method further includes receiving, by the terminal device, the second signal on the third time-frequency resource, and receiving, by the terminal device, the second signal, and continuing, by the terminal device, to use the reference signal.

A utilization ratio of system resources is improved by multiplexing the third time-frequency resource to transmit the reference signal and the second signal.

Optionally, in an embodiment, the reference signal is used by the terminal device to determine channel state information.

The method further includes skipping, by the terminal device, sending the channel state information to the network device when the third time-frequency resource is included in the first time-frequency resource, sending, by the terminal device, the channel state information and third indication information to the network device when the third time-frequency resource is included in the first time-frequency resource, where the third indication information indicates that the channel state information is invalid, skipping, by the terminal device, sending the channel state information to the network device when a ratio of the third time-frequency resource to the first time-frequency resource reaches or exceeds a first threshold, or sending, by the terminal device, the channel state information and third indication information to the network device when a ratio of the third time-frequency resource to the first time-frequency resource reaches or exceeds a first threshold, where the third indication information indicates that the channel state information is invalid.

Specifically, that when the third time-frequency resource is included in the first time-frequency resource may be understood as that when an exception (such as being occupied or blanked) occurs in at least a part of a time-frequency resource (that is the third time-frequency resource) transmitting the reference signal. The ratio of the third time-frequency resource to the first time-frequency resource may refer to a ratio of a quantity of resource elements (REs) in the third time-frequency resource to a quantity of REs in the first time-frequency resource, or may refer to a ratio of a quantity of time-frequency resources in which an exception (such as being occupied or blanked) occurs in time-frequency resources that are used by the terminal device to transmit the reference signal to a total quantity of time-frequency resources that are used by the terminal device to transmit the reference signal.

It should be noted that the channel state information and the third indication information may be two independent pieces of information, or the channel state information carries the third indication information. For example, one bit in the channel state information may be used as the third indication information, or a state value of the channel state information may be used as the third indication information.

In this embodiment of this application, the terminal device may determine precision of the channel state information based on whether an exception (such as being occupied or blanked) occurs in the time-frequency resource used to receive the reference signal. When the precision of the channel state information is not high, the terminal device may skip sending the channel state information to the network device or indicating that the channel state information is invalid to the network device, to avoid the network device from using state indication information without enough precision.

It should be noted that in an example, the channel state information is related to a first frequency domain resource. The first frequency domain resource is less than or equal to a system bandwidth. For example, the channel state information may be at least one of CQI, PMI, RI, and the like. The reference signal may be a reference signal used to measure a channel state of a wideband, and the reference signal may alternatively be a reference signal used to measure a channel state of a sub-band. In another example, the channel state information is merely used by the terminal device to feed back information, such as lobe state information, that is not related to a frequency domain resource to the network device.

Optionally, in an embodiment, the reference signal is used by the terminal device to determine channel state information. The method further includes sending, by the terminal device, the channel state information to the network device when a ratio of the third time-frequency resource to the first time-frequency resource does not reach or exceed a first threshold, where the channel state information is obtained by using at least a part in the first time-frequency resource other than the third time-frequency resource.

It should be understood that the ratio of the third time-frequency resource to the first time-frequency resource may refer to a ratio of a quantity of REs in the third time-frequency resource to a quantity of REs in the first time-frequency resource, or may refer to a ratio of a quantity of time-frequency resources in which an exception (such as being occupied or blanked) occurs in time-frequency resources that are used by the terminal device to transmit the reference signal to a total quantity of time-frequency resources that are used by the terminal device to transmit the reference signal.

Optionally, in an embodiment, the reference signal is used by the terminal device to determine channel state information. The method further includes sending, by the terminal device, the channel state information to the network device, where the channel state information is obtained by using at least a part in the first time-frequency resource other than the third time-frequency resource.

Specifically, the terminal device may discard a signal received on the third time-frequency resource, use the reference signal received on a time-frequency resource in the first time-frequency resource other than the third time-frequency resource, and calculate the channel state information of the first frequency domain resource.

It should be noted that the channel state information determined by the terminal device includes at least one type of the following information channel state information (CSI), channel quality index information, precoding indicator (PMI) information, rank indicator (RI) information, lobe quality information, and the like.

Specifically, the CSI may specifically refer to information used to reflect a channel state, or may be a collective name of one or more types of other information. The CQI is used by the terminal device to feed back a modulation and coding scheme (or efficiency) index to the network device, where the index is used to indicate channel quality of a frequency domain resource corresponding to the index. The PMI is used by the terminal device to feed back a precoding matrix or a precoding matrix index suitable for the channel of a frequency domain resource to the network device. The RI is used by the terminal device to feed back a stratum (or a rank) of multiple-antenna transmission that can be supported by a channel of a frequency domain resource to the network device. The lobe quality information is used by the terminal device to feed back channel quality corresponding to at least one lobe to the network device.

The following describes the communication method of this embodiment of this application in detail by using a reference signal used by the terminal device to demodulate at least one information block as an example.

For ease of understanding, reference signals included in this embodiment of this application are first briefly described.

A first demodulation reference signal included in the following may be a basic DMRS or a front-loaded DMRS, which may be also referred to as a front DMRS, a normal DMRS, a regular DMRS, or the like. In a time domain, a time-frequency resource used to transmit/receive the basic DMRS may be located in front of a time-frequency resource at which data demodulated by using the basic DMRS is located, or in the front of a time domain unit corresponding to the time-frequency resource at which the data channel is located.

A second demodulation reference signal included in the following may be an additional DMRS, which may also be referred to as a post-loaded (post loaded or postposition) DMRS, a post DMRS, or the like. In a time domain, a time-frequency resource used to transmit/receive the additional DMRS is located in the rear of a time domain transmission corresponding to a time-frequency resource at which the data demodulated by using the additional DMRS is located. In addition, the additional DMRS is an optional DMRS. To be specific, not all pieces of data have a corresponding additional DMRS during transmission. The network device may send indication information to the terminal device, to indicate, to the terminal device, that there is additional DMRS sent together with data after the indication information is received, or the network device indicates, to the terminal device by using the indication information, that there is no additional DMRS sent together with the data after the indication information is received. When the terminal device is in a signal propagation environment with a rapid channel change or poor channel quality, the additional DMRS is used to help the terminal device to improve channel estimation precision, and improve reception reliability of the data channel, thereby reducing a quantity of retransmissions, and further improving utilization efficiency of time frequency resources of the system. When the terminal device is in a signal propagation environment with slow channel encoding or good channel quality, channel estimation precision that is good enough can be obtained by using the basic DMRS, and the additional DMRS does not need to be sent.

It should further be understood that for a data transmission, a configuration priority of the basic DMRS is higher than that of the additional DMRS. Specifically, when the network device configures the basic DMRS, for example, a sequence generation parameter of the DMRS or a time-frequency location at which the DMRS is sent. In each data transmission, there is a basic DMRS that is sent together with the data. However, only when the network device indicates that the additional DMRS exists (or indicates that the additional DMRS is activated/enabled/marked as an available signal, and the like) to the terminal device, the basic DMRS and the additional DMRS are sent together with the data during data transmission.

Optionally, in an embodiment, the reference signal is used by the terminal device to demodulate at least one information block. The method further includes when the third time-frequency resource is included in the first time-frequency resource, demodulating, by the terminal device, the at least one information block without using a signal on the third time-frequency resource or skipping demodulating the at least one information block.

Specifically, when the third time-frequency resource is included in the first time-frequency resource used to receive the reference signal, that is, an exception (such as being occupied or blanked) occurs in the third time-frequency resource, or the reference signal on the third time-frequency resource is interfered, the terminal device may demodulate some or all information blocks without using the signal on the third time-frequency resource.

Alternatively, when an exception (such as being occupied or blanked) occurs in a third transmission resource used to receive a reference signal, or the reference signal on the third time-frequency resource is interfered, the terminal device may skip demodulating the at least one information block.

It should be understood that when the network device schedules the terminal device to perform physical-layer data transmission, tone or more information blocks are actually transmitted. One information block includes several information bits. The information bits are divided into one or more code blocks based on a quantity of the information bits. A channel coding bit is generated after channel encoding is performed on information bits in one code block once. A code block group includes at least one code block. The "information block" may be one or more transport blocks, one or more code blocks, or one or more code block groups.

Optionally, in an embodiment, the reference signal is used by the terminal device to demodulate at least one information block. The method further includes skipping, by the terminal device, demodulating the at least one information block when a ratio of the third time-frequency resource to the first time-frequency resource reaches or exceeds a second threshold.

It should be understood that the ratio of the third time-frequency resource to the first time-frequency resource may refer to a ratio of a quantity of REs in the third time-frequency resource to a quantity of REs in the first time-frequency resource, or may refer to a ratio of a quantity of time-frequency resources in which an exception (such as being occupied or blanked) occurs in time-frequency resources that are used by the terminal device to transmit the reference signal to a total quantity of time-frequency resources that are used by the terminal device to transmit the reference signal.

Optionally, in an embodiment, the reference signal is used by the terminal device to demodulate at least one information block. The method further includes when a ratio of the third time-frequency resource to the first time-frequency resource does not reach or exceed a second threshold, demodulating, by the terminal device, the at least one information block by using a signal on at least a part of a time-frequency resource in the first time-frequency resource other than the third time-frequency resource.

Specifically, the time-frequency resource that is used by the terminal device and that is in the first time-frequency resource other than the third time-frequency resource may be understood as a time-frequency resource that normally transmits the reference signal. To be specific, the terminal device may demodulate the at least one information block by using a reference signal received on the transmission resource in which no exception (such as being occupied or blanked) occurs.

It should be understood that the ratio of the third time-frequency resource to the first time-frequency resource may refer to a ratio of a quantity of REs in the third time-frequency resource to a quantity of REs in the first time-frequency resource, or may refer to a ratio of a quantity of time-frequency resources in which an exception (such as being occupied or blanked) occurs in time-frequency resources that are used by the terminal device to transmit the reference signal to a total quantity of time-frequency resources that are used by the terminal device to transmit the reference signal.

Optionally, the reference signal only includes a first demodulation reference signal, or the reference signal includes the first demodulation reference signal and a second demodulation reference signal, where the first demodulation reference signal is a basic demodulation reference signal used to demodulate the at least one information block, and the second demodulation reference signal is an additional demodulation reference signal used to demodulate the at least one information block.

For example, the third time-frequency resource is used to transmit at least a part of the first demodulation reference signal and at least a part of the second demodulation reference signal, but a ratio of the third time-frequency resource in the first time-frequency resource does not reach or exceed the second threshold, the terminal device may use the reference signal to demodulate the information block. This reduces a quantity of retransmissions of the information block, and further improves utilization efficiency of time-frequency resources of the system.

Optionally, the reference signal is used by the terminal device to demodulate at least one information block, and the reference signal includes a first demodulation reference signal and a second demodulation reference signal, where the first demodulation reference signal is a basic demodulation reference signal used to demodulate the at least one information block, the second demodulation reference signal is an additional demodulation reference signal used to demodulate the at least one information block, the first demodulation reference signal occupies a first part of the first time-frequency resource, and the second demodulation reference signal occupies a second part of the first time-frequency resource.

The method further includes when the third time-frequency resource is included in the first part, demodulating, by the terminal device, the at least one information block without using a signal on the third time-frequency resource or skipping demodulating the at least one information block, skipping, by the terminal device, demodulating the at least one information block when a ratio of a first intersection set between the third time-frequency resource and the first part to the first part reaches or exceeds a third threshold, when a ratio of a first intersection set between the third time-frequency resource and the first part to the first part does not reach or exceed a third threshold, demodulating, by the terminal device, the at least one information block by using a signal on at least a part of a time-frequency resource in the first part other than the first intersection set, when the third time-frequency resource is included in the second part, demodulating, by the terminal device, the at least one information block without using a signal on the third time-frequency resource or skipping demodulating the at least one information block, when a ratio of a second intersection set between the third time-frequency resource and the second part to the second part reaches or exceeds a fourth threshold, demodulating, by the terminal device, the at least one information block without using the second demodulation reference signal, and/or when a ratio of a second intersection set between the third time-frequency resource and the second part to the second part does not reach or exceed a fourth threshold, demodulating, by the terminal device, the at least one information block by using a signal on at least a part of a time-frequency resource in the second part other than the second intersection set.

For example, when the third time-frequency resource is included in the first part, that is, an exception occurs in the time-frequency resource that is originally used to receive the first demodulation reference signal (that is, the basic DMRS), the terminal device may demodulate the at least one information block without using the signal on the third time-frequency resource or directly skip demodulating the at least one information block. To be specific, because the exception occurs in the time-frequency resource (that is, the third time-frequency resource) that is originally used to receive the basic DMRS, the terminal device may demodulate the at least one information block without using the signal on the third time-frequency resource or directly skip demodulating the at least one information block.

For another example, if at least a part of the time-frequency resource in the time-frequency resource (that is, the third time-frequency resource) in which an exception occurs is used to transmit the first demodulation reference signal, and a ratio of a first intersection set between the third time-frequency resource and the first part to the first part reaches or exceeds a third threshold, to be specific, a large quantity of exceptions occur in the time-frequency resource that is originally used to receive the first demodulation reference signal to a degree that precision of information block demodulation is affected, the terminal device may skip demodulating the at least one information block.

It should be noted that when a large quantity of exceptions occur in the time-frequency resource that is originally used to receive the first demodulation reference signal to a degree that precision of information block demodulation is affected, regardless of whether an exception occurs in the time-frequency resource that is originally used to receive the additional DMRS, the terminal device may skip demodulating the at least one information block.

Because a configuration priority of the basic DMRS is higher, compared with independent use of the additional DMRS, the basic DMRS may usually provide better channel estimation precision. In the implementations of the foregoing examples, determining whether to demodulate at least one information block based on a degree by which the basic DMRS is affected can reduce implementation complexity of the terminal device.

For another example, if the time-frequency resource (that is the third time-frequency resource) in which an exception occurs is originally used to receive the additional DMRS, and no exception occurs in the time-frequency resource used to transmit the basic DMRS, to be specific, the third time-frequency resource is not originally used to receive the basic DMRS, the terminal device may demodulate the information block by only using the basic DMRS.

For another example, if the time-frequency resource (that is, the third time-frequency resource) in which an exception occurs is originally used to receive the additional DMRS, exceptions occur in a large quantity of time-frequency resources, to be specific, the ratio of the second intersection set between the third time-frequency resource and the second part to the second part reaches or exceeds the fourth threshold, and no exception occurs in the time-frequency resource used to receive the basic DMRS, that is, the third time-frequency resource is not originally used to receive the basic DMRS, the terminal device may demodulate the information block by only using the basic DMRS.

Because the basic DMRS is a reference signal that is necessarily sent during data transmission, a time-frequency location of the basic DMRS is relatively fixed. Compared with the basic DMRS, a probability in which an exception occurs in the time-frequency resource at which the additional DMRS is located in higher. Further, whether an exception occurs in a resource at which the additional DMRS is located is independently determined by using the implementations of the foregoing examples, a time-frequency resource in which the exception occurs can be distinguished more carefully, and whether to demodulate the information block and how to demodulate the information block by using the reference signal can be determined based on a specific case of the time-frequency resource in which the exception occurs, so that utilization efficiency of a spectrum can be improved to some extent.

Optionally, in an embodiment, the reference signal is used to calculate a phase error. The method further includes calculating, by the terminal device, the phase error without using the reference signal, when a ratio of the third time-frequency resource to the first time-frequency resource exceeds a fifth threshold, calculating, by the terminal device, the phase error without using the reference signal, or when a ratio of the third time-frequency resource to the first time-frequency resource does not exceed or reach a fifth threshold, calculating, by the terminal device, the phase error by using the reference signal.

For a multiple-antenna system, especially, a multiple-antenna system working at a band higher than 6 GHz, jitter of phase noise is usually one of the factors affecting performance of the system. A terminal determines whether to calculate the phase error by using the PTRS, which is advantageous to improve estimation precision of the phase noise, so that the terminal device compensates for the phase noise more accurately in a process of processing a received signal, reception accuracy of the data channel is improved, and unnecessary data channel retransmissions are reduced, thereby further improving utilization efficiency of time-frequency resources of the system.

It should be understood that at least one threshold in the first threshold, the second threshold, the third threshold, the fourth threshold, and the fifth threshold may be predefined by a communications standard, protocol, or specification or may be configured by the network device for the terminal device through signaling. When the network device performs configuration for the terminal device through signaling, the network device may perform configuration for the terminal device through physical-layer control signaling, MAC-layer signaling, or RRC-layer signaling. This is not specifically limited in the embodiments of this application.

The communication method of the embodiments of this application is described in detail with reference to FIG. 1 to FIG. 7. The following describes an apparatus of the embodiments of this application in detail with reference to FIG. 8 to FIG. 11. It should be understood that the apparatus shown in FIG. 8 to FIG. 11 can implement the steps in FIG. 1 to FIG. 7. To avoid repetition, details are not described herein again.

Figure 8:
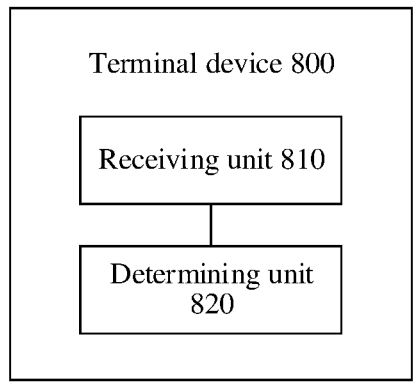
FIG. 8 is a schematic block diagram of a terminal device according to an embodiment of this application.

FIG. 8 is a schematic block diagram of a terminal device according to an embodiment of this application. The terminal device 800 shown in FIG. 8 includes a receiving unit 810 and a determining unit 820.

The receiving unit 810 is configured to receive first indication information sent by a network device, where the first indication information indicates a first time-frequency resource used to receive a reference signal of the terminal device.

The receiving unit 810 is further configured to receive second indication information sent by the network device, where the second indication information indicates a second time-frequency resource.

The determining unit 820 is configured to determine, according to the second indication information received by the receiving unit, whether a third time-frequency resource is included in the first time-frequency resource, where the third time-frequency resource is a time-frequency resource included in both of the first time-frequency resource and the second time-frequency resource, a time-frequency resource adjacent to the second time-frequency resource, a time-frequency resource whose interval from the second time-frequency resource is less than a preset first interval, or a time-frequency resource related to the second time-frequency resource.

In this embodiment of this application, the second indication information is sent to the terminal device to enable the terminal device to determine whether the third time-frequency resource exists, where the third time-frequency resource is likely to be a time-frequency resource that is originally used to receive the reference signal but has an exception, so that the terminal device further determines whether to use a signal received on the third time-frequency resource, thereby avoiding a case in which the terminal device directly uses a signal as a reference signal in the prior art, where the signal is received on a time-frequency resource used to receive a reference signal, from reducing precision of channel estimation or channel detection or resulting in a data demodulation failure.

Optionally, in an embodiment, the second indication information is further used to indicate that the signal on the second time-frequency resource is unavailable, and/or the second indication information is further used to indicate a retransmitted code block or a retransmitted code block group (CBG), and in a previous transmission of the retransmitted code block or the retransmitted CBG, the second time-frequency resource is occupied.

Optionally, in an embodiment, the reference signal is used by the terminal device to determine channel state information.

The terminal device further includes a first sending unit, configured to skip sending the channel state information to the network device when the third time-frequency resource is included in the first time-frequency resource, the first sending unit, further configured to send, by the terminal device, the channel state information and third indication information to the network device when the third time-frequency resource is included in the first time-frequency resource, where the third indication information indicates that the channel state information is invalid, the first sending unit, further configured to skip sending the channel state information to the network device when a ratio of the third time-frequency resource to the first time-frequency resource reaches or exceeds a first threshold, or the first sending unit, further configured to send the channel state information and third indication information to the network device when a ratio of the third time-frequency resource to the first time-frequency resource reaches or exceeds a first threshold, where the third indication information indicates that the channel state information is invalid.

Optionally, in an embodiment, the reference signal is used by the terminal device to determine channel state information.

The terminal device further includes a second sending unit, configured to send the channel state information to the network device when a ratio of the third time-frequency resource to the first time-frequency resource does not reach or exceed a first threshold, where the channel state information is obtained by using at least a part in the first time-frequency resource other than the third time-frequency resource, the second time sending unit, further configured to send the channel state information to the network device, where the channel state information is obtained by using at least a part in the first time-frequency resource other than the third time-frequency resource.

Optionally, in an embodiment, the channel state information is related to a first frequency domain resource, and the first frequency domain resource is less than or equal to a system bandwidth.

Optionally, in an embodiment, the reference signal is used by the terminal device to demodulate at least one information block.

The terminal device further includes a first demodulation unit, configured to when the third time-frequency resource is included in the first time-frequency resource, demodulate the at least one information block without using a signal on the third time-frequency resource or skipping demodulating the at least one information block, the first demodulation unit, further configured to skip demodulating the at least one information block when a ratio of the third time-frequency resource to the first time-frequency resource reaches or exceeds a second threshold, and/or the first demodulation unit, further configured to demodulate the at least one information block by using a signal on at least a part of a time-frequency resource in the first time-frequency resource other than the third time-frequency resource when a ratio of the third time-frequency resource to the first time-frequency resource does not reach or exceed a second threshold.

Optionally, in an embodiment, the reference signal only includes a first demodulation reference signal, or the reference signal includes the first demodulation reference signal and a second demodulation reference signal, where the first demodulation reference signal is a basic demodulation reference signal used to demodulate the at least one information block, and the second demodulation reference signal is an additional demodulation reference signal used to demodulate the at least one information block.

Optionally, in an embodiment, the reference signal is used by the terminal device to demodulate at least one information block, and the reference signal includes a first demodulation reference signal and a second demodulation reference signal, where the first demodulation reference signal is a basic demodulation reference signal used to demodulate the at least one information block, the second demodulation reference signal is an additional demodulation reference signal used to demodulate the at least one information block, the first demodulation reference signal occupies a first part of the first time-frequency resource, and the second demodulation reference signal occupies a second part of the first time-frequency resource.

The terminal device further includes a second demodulation unit, configured to when the third time-frequency resource is included in the first part, demodulate the at least one information block without using a signal on the third time-frequency resource or skip demodulating the at least one information block, the second demodulation unit, further configured to skip demodulating the at least one information block when a ratio of a first intersection set between the third time-frequency resource and the first part to the first part reaches or exceeds a third threshold, the second demodulation unit, further configured to when a ratio of a first intersection set between the third time-frequency resource and the first part to the first part does not reach or exceed a third threshold, demodulate the at least one information block by using a signal on at least a part of the time-frequency resource in the first part other than the first intersection set, the second demodulation unit, further configured to when a ratio of a second intersection set between the third time-frequency resource and the second part to the second part reaches or exceeds a fourth threshold, demodulate the at least one information block without using the second demodulation reference signal, the second demodulation unit, further configured to when a ratio of a second intersection set between the third time-frequency resource and the second part to the second part does not reach or exceed a fourth threshold, demodulate the at least one information block by using a signal on at least a part of the time-frequency resource in the second part other than the second intersection set, and/or the second demodulation unit, further configured to when the third time-frequency resource is included in the second part, demodulate the at least one information block without using a signal on the third time-frequency resource or skip demodulating the at least one information block.

Figure 9:
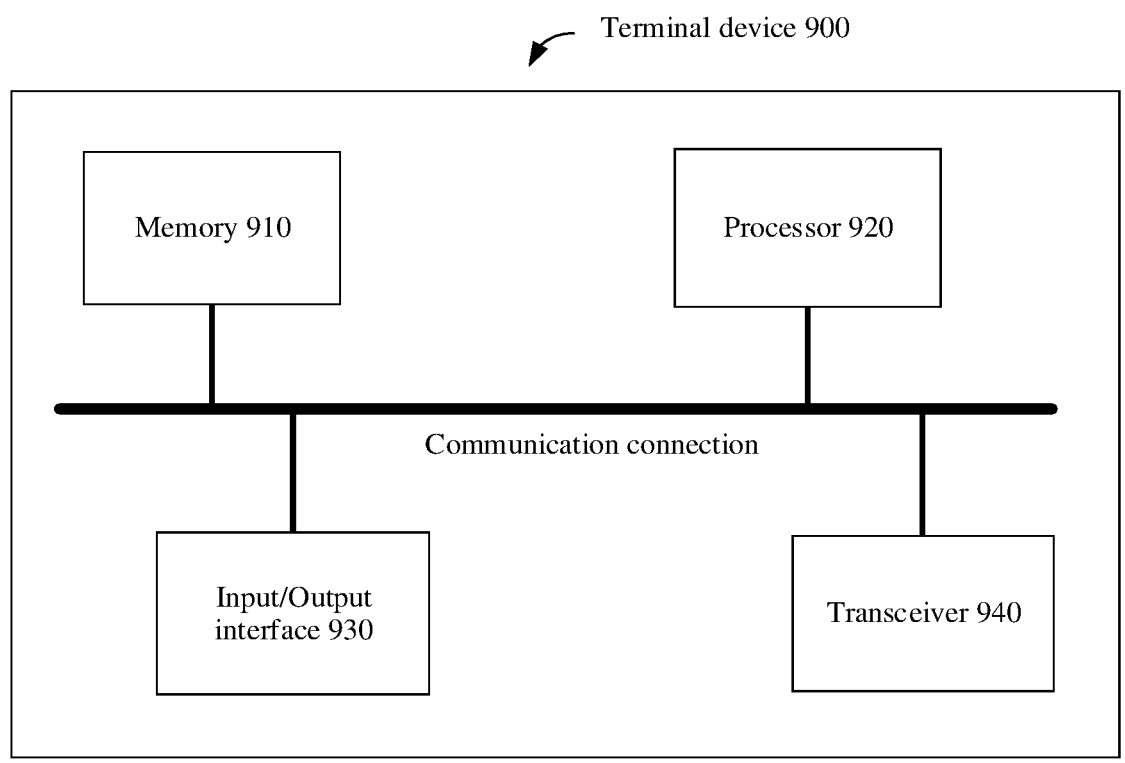
FIG. 9 is a schematic block diagram of a terminal device according to another embodiment of this application.

In an optional embodiment, the receiving unit 810 may be a transceiver 940, the determining unit 820 may be a processor 920, and the terminal device may further include an input/output interface 930 and a memory 910, details are shown in FIG. 9.

FIG. 9 is a schematic block diagram of a terminal device according to another embodiment of this application. The terminal device 900 as shown in FIG. 9 may include a memory 910, a processor 920, an input/output interface 930, and a transceiver 940. The memory 910, the processor 920, the input/output interface 930, and the transceiver 940 are connected to each other through an internal connection path. The memory 910 is configured to store an instruction. The processor 920 is configured to implement the instruction stored in the memory 920, to control the input/output interface 930 to receive input data and information, output data such as an operation result, and control the transceiver 940 to send a signal.

The processor 920 is configured to determine a proprietary transmission resource used to transmit a scheduling request SR.

The transceiver 940 is configured to send the SR to a network device on the proprietary transmission resource determined by the determining unit.

It should be understood that in the embodiments of this application, the processor 920 may implement related programs by using a general purpose central processing unit (CPU), a microprocessor, an application-specific integrated circuit (ASIC), or one or more integrated circuits, to implement the technical solutions provided in the embodiments of this application.

It should further be understood that the transceiver 940 may also be referred to as a communications interface, to implement communication between a terminal 900 and another device or communication network by using a transmitting and receiving apparatus, for example, but not limited to, a transceiver.

The memory 910 may include a read-only memory and a random access memory, and provide an instruction and data to the processor 920. A part of the processor 920 may further include a non-volatile random access memory. For example, the processor 920 may further store information of a device type.

In an implementation process, steps in the foregoing methods can be implemented by using a hardware integrated logical circuit in the processor 920, or by using instructions in a form of software. The communication method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in the memory 910, and a processor 920 reads information in the memory 910 and completes the steps in the foregoing methods in combination with hardware of the processor. To avoid repetition, details are not described herein again.

It should be understood that, the processor in the embodiments of this application may be a central processing unit (CPU), or may further be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

Figure 10:
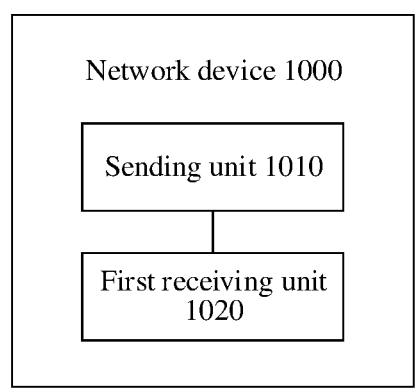
FIG. 10 is a schematic structural diagram of a communications network device according to an embodiment of this application.

FIG. 10 is a schematic structural diagram of a communications network device according to an embodiment of this application. The network device 1000 as shown in FIG. 10 includes a sending unit 1010 and a first receiving unit 1020.

The sending unit is configured to send first indication information to a terminal device, where the first indication information indicates a first time-frequency resource used to transmit a reference signal of the terminal device, the sending unit, further configured to send second indication information to the terminal device, where the second indication information indicates a second time-frequency resource, the second indication information is further used to determine whether a third time-frequency resource is included in the first time-frequency resource, and the third time-frequency resource is a time-frequency resource included in both of the first time-frequency resource and the second time-frequency resource, a time-frequency resource adjacent to the second time-frequency resource, a time-frequency resource whose interval from the second time-frequency resource is less than a preset first interval, or a time-frequency resource related to the second time-frequency resource.

In this embodiment of this application, the second indication information is sent to the terminal device to enable the terminal device to determine whether the third time-frequency resource exists, where the third time-frequency resource is likely to be a time-frequency resource that is originally used to transmit the reference signal but has an exception, so that the terminal device further determines whether to use a signal received on the third time-frequency resource, thereby avoiding a case in which the terminal device directly uses a signal as a reference signal in the prior art, where the signal is received on a time-frequency resource used to transmit a reference signal, from reducing precision of channel estimation or channel detection or resulting in a data demodulation failure.

Optionally, in an embodiment, the second indication information is further used to indicate that the signal on the second time-frequency resource is unavailable, or the second indication information is further used to indicate a retransmitted code block or a retransmitted code block group (CBG), and in a previous transmission of the retransmitted code block or the retransmitted CBG, the second time-frequency resource is occupied.

Optionally, in an embodiment, the reference signal is used by the terminal device to determine channel state information, and the network device further includes a first receiving unit, configured to receive the channel state information and third indication information that are sent by the terminal device when the third time-frequency resource is included in the first time-frequency resource, where the third indication information indicates that the channel state information is invalid, where the first receiving unit is further configured to receive the channel state information and third indication information sent by the network device when a ratio of the third time-frequency resource to the first time-frequency resource reaches or exceeds a first threshold, where the third indication information indicates that the channel state information is invalid.

Optionally, in an embodiment, the reference signal is used by the terminal device to determine channel state information, and the network device further includes a second receiving unit, configured to receive the channel state information sent by the terminal device when a ratio of the third time-frequency resource to the first time-frequency resource does not reach or exceed a first threshold, where the channel state information is obtained by using at least a part in the first time-frequency resource other than the third time-frequency resource, where the second receiving unit is further configured to receive the channel state information sent by the terminal device, where the channel state information is obtained by using at least a part in the first time-frequency resource other than the third time-frequency resource.

Optionally, in an embodiment, the channel state information is related to the first frequency domain resource, and the first frequency domain resource is less than or equal to a system bandwidth.

Figure 11:
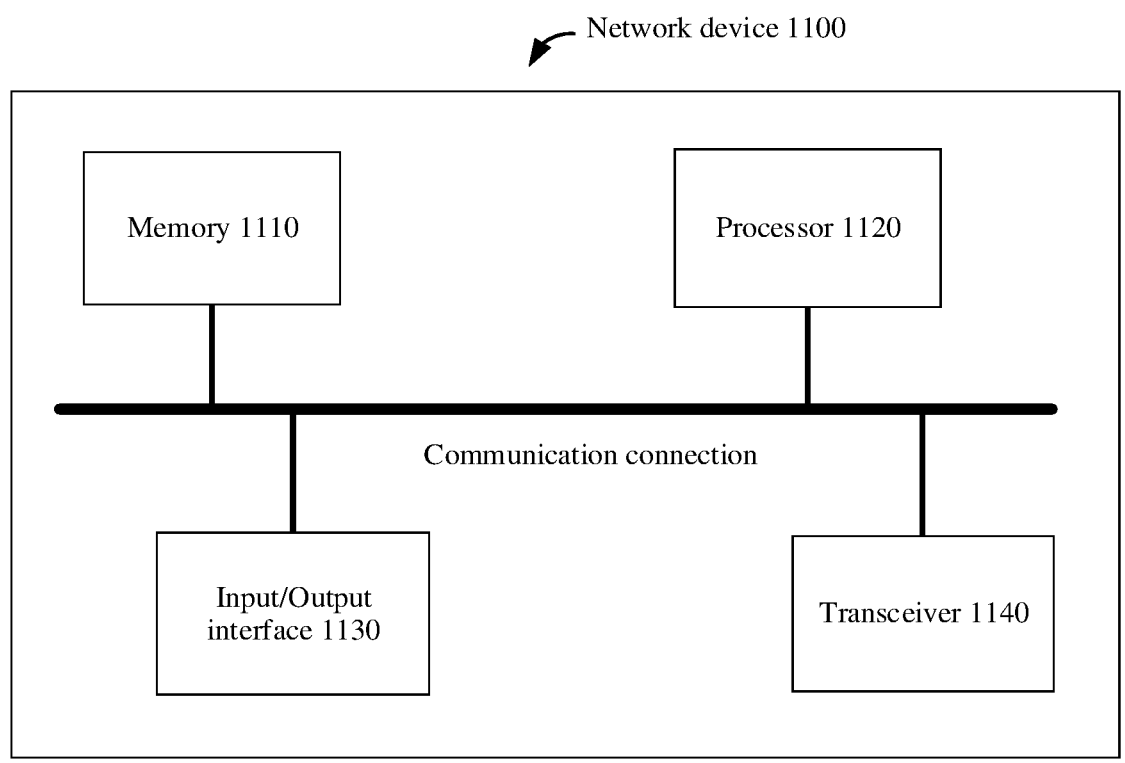
FIG. 11 is a schematic block diagram of a network device according to another embodiment of this application.

In an optional embodiment, the sending unit 1010 and the first receiving unit 1020 may be a transceiver 1140, and the network device may further include an input/output interface 1130 and a memory 1110, details are shown in FIG. 11.

FIG. 11 is a schematic block diagram of a network device according to another embodiment of this application. The network device 1100 as shown in FIG. 11 may include a memory 1110, a processor 1120, an input/output interface 1130, and a transceiver 1140. The memory 1110, the processor 1120, the input/output interface 1130, and the transceiver 1140 are connected to each other through an internal connection path. The memory 1110 is configured to store an instruction. The processor 1120 is configured to implement the instruction stored in the memory 1120, to control the input/output interface 1130 to receive input data and information, output data such as an operation result, and control the transceiver 1140 to send a signal.

The transceiver 1140 is configured to send first indication information to a terminal device, where the first indication information indicates a first time-frequency resource used to transmit a reference signal of the terminal device, and further configured to send second indication information to the terminal device, where the second indication information indicates a second time-frequency resource, the second indication information is further used to determine whether a third time-frequency resource is included in the first time-frequency resource, and the third time-frequency resource is a time-frequency resource included in both of the first time-frequency resource and the second time-frequency resource, a time-frequency resource adjacent to the second time-frequency resource, a time-frequency resource whose interval from the second time-frequency resource is less than a preset first interval, or a time-frequency resource related to the second time-frequency resource.

It should be understood that in the embodiments of this application, the processor 1120 may implement related programs by using a general purpose central processing unit (CPU), a microprocessor, an application-specific integrated circuit (ASIC), or one or more integrated circuits, to implement the technical solutions provided in the embodiments of this application.

It should further be understood that the transceiver 1140 may also be referred to as a communications interface, to implement communication between a network device 1100 and another device or a communication network by using a transmitting and receiving apparatus such as but is not limited to a transceiver.

The memory 1110 may include a read-only memory and a random access memory, and provide an instruction and data to the processor 1120. A part of the processor 1120 may further include a non-volatile random access memory. For example, the processor 1120 may further store information of a device type.

In an implementation process, steps in the foregoing methods can be implemented by using a hardware integrated logical circuit in the processor 1120, or by using instructions in a form of software. The communication method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in the memory 1110, and a processor 1120 reads information in the memory 1110 and completes the steps in the foregoing methods in combination with hardware of the processor. To avoid repetition, details are not described herein again.

It should be understood that, the processor in the embodiments of this application may be a central processing unit (CPU), or may further be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It should further be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through exemplary but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device, first indication information sent by a network device, wherein the first indication information indicates a first time-frequency resource used to receive a reference signal transmitted to the terminal device;
   receiving, by the terminal device, second indication information sent by the network device, wherein the second indication information indicates a second time-frequency resource;
   determining, by the terminal device according to the second indication information, that the first time-frequency resource used to receive the reference signal comprises a third time-frequency resource that carries a signal unusable as the reference signal, when the third time-frequency resource is at least one of:
   a time-frequency resource comprised in both of the first time-frequency resource and the second time-frequency resource,
   a time-frequency resource adjacent to the second time-frequency resource,
   a time-frequency resource that has a distance from the second time-frequency resource in a time domain less than a preset first interval, or
   a time-frequency resource with a scheduled transmission that is related to a transmission in the second time-frequency resource; and
   determining, by the terminal device, whether the reference signal received is valid for use based on the first time-frequency resource and the third time-frequency resource.

2. The method according to claim 1, wherein the second indication information further:
   indicates that a signal on the second time-frequency resource is unavailable, or
   indicates a retransmitted code block or a retransmitted code block group (CBG), wherein the second time-frequency resource was used for a previous transmission of the retransmitted code block or the retransmitted CBG.

3. The method according to claim 1, wherein the reference signal is used by the terminal device to determine channel state information; and
   wherein the method further comprises:
   skipping, by the terminal device, sending the channel state information to the network device when determining that the signal carried in the third time-frequency resource is not usable as the reference signal;
   sending, by the terminal device, the channel state information and third indication information to the network device when determining that the signal carried in the third time-frequency resource is not usable as the reference signal, wherein the third indication information indicates that the channel state information is invalid;
   skipping, by the terminal device, sending the channel state information to the network device when a ratio of a quantity of resource elements (REs) in the third time-frequency resource to a quantity of REs in the first time-frequency resource exceeds a first threshold; or
   sending, by the terminal device, the channel state information and the third indication information to the network device when the ratio of the quantity of REs in the third time-frequency resource to the quantity of REs in the first time-frequency resource exceeds the first threshold, wherein the third indication information indicates that the channel state information is invalid.

4. The method according to claim 3, wherein the channel state information is related to a first frequency domain resource, and the first frequency domain resource has a bandwidth that is less than or equal to a system bandwidth.

5. The method according to claim 1, wherein the reference signal is used by the terminal device to determine channel state information; and
   wherein the method further comprises:
   sending, by the terminal device, the channel state information to the network device when a ratio of a quantity of resource elements (REs) in the third time-frequency resource to a quantity of REs in the first time-frequency resource does not exceed a first threshold, wherein the channel state information is obtained by using a signal carried in at least a part of the first time-frequency resource other than the third time-frequency resource; or
   sending, by the terminal device, the channel state information to the network device, wherein the channel state information is obtained by using a signal carried in at least a part of the first time-frequency resource other than the third time-frequency resource.

6. The method according to claim 1, wherein the reference signal is used by the terminal device to demodulate at least one information block; and
   wherein the method further comprises:
   when the signal carried in the third time-frequency resource is not usable as the reference signal, demodulating, by the terminal device, the at least one information block without using the signal carried in the third time-frequency resource, or skipping demodulating the at least one information block;
   skipping, by the terminal device, demodulating the at least one information block when a ratio of a quantity of REs in the third time-frequency resource to a quantity of REs in the first time-frequency resource exceeds a second threshold; or
   when the ratio does not exceed the second threshold, demodulating, by the terminal device, the at least one information block by using a signal carried in at least a part of a time-frequency resource in the first time-frequency resource other than the third time-frequency resource.

7. The method according to claim 6, wherein the reference signal comprises only a first demodulation reference signal, or the reference signal comprises the first demodulation reference signal and a second demodulation reference signal; and
   wherein the first demodulation reference signal is a basic demodulation reference signal used to demodulate the at least one information block, and wherein the second demodulation reference signal is an additional demodulation reference signal used to demodulate the at least one information block.

8. The method according to claim 1, wherein the reference signal is used by the terminal device to demodulate at least one information block, and the reference signal comprises a first demodulation reference signal and a second demodulation reference signal, wherein the first demodulation reference signal is a basic demodulation reference signal used to demodulate the at least one information block, the second demodulation reference signal is an additional demodulation reference signal used to demodulate the at least one information block, the first demodulation reference signal occupies a first part of the first time-frequency resource, and the second demodulation reference signal occupies a second part of the first time-frequency resource; and wherein the method further comprises:
when the third time-frequency resource is comprised in the first part of the first time-frequency resource, demodulating, by the terminal device, the at least one information block without using the signal on the third time-frequency resource, or skipping demodulating the at least one information block;
skipping, by the terminal device, demodulating the at least one information block when a first ratio of a quantity of REs in a first intersection set between the third time-frequency resource and the first part of the first time-frequency resource to a quantity of REs in the first part of the first time-frequency resource exceeds a third threshold;
when the first ratio does not exceed the third threshold, demodulating, by the terminal device, the at least one information block by using a signal on at least a part of a time-frequency resource in the first part of the first time-frequency resource other than the first intersection set;
when the third time-frequency resource is comprised in the second part of the first time-frequency resource, demodulating, by the terminal device, the at least one information block without using the signal on the third time-frequency resource, or skipping demodulating the at least one information block;
when a second ratio of a quantity of REs in a second intersection set between the third time-frequency resource and the second part of the first time-frequency resource to the second part of the first time-frequency resource exceeds a fourth threshold, demodulating, by the terminal device, the at least one information block without using the second demodulation reference signal; or
when the second ratio does not exceed the fourth threshold, demodulating, by the terminal device, the at least one information block by using a signal on at least a part of a time-frequency resource in the second part of the first time-frequency resource other than the second intersection set.

9. A communication method, comprising:
sending, by a network device, first indication information to a terminal device, wherein the first indication information indicates a first time-frequency resource used to transmit a reference signal to the terminal device; and
sending, by the network device, second indication information to the terminal device, wherein the second indication information indicates a second time-frequency resource, the second indication information enabling the terminal device to determine whether the first time-frequency resource comprises a third time-frequency resource that carries a usable signal of the reference signal, and to determine whether the reference signal carried in the first time-frequency resource is valid for use, and the third time-frequency resource does not carry the usable signal when the third time-frequency resource is at least one of:
a time-frequency resource comprised in both of the first time-frequency resource and the second time-frequency resource,
a time-frequency resource adjacent to the second time-frequency resource,
a time-frequency resource that has a distance from the second time-frequency resource in a time domain less than a preset first interval, or
a time-frequency resource with a scheduled transmission that is related to a transmission in the second time-frequency resource.

10. The method according to claim 9, wherein the second indication information further:
indicates that a signal on the second time-frequency resource is unavailable, or
indicates a retransmitted code block or a retransmitted code block group (CBG), wherein the second time-frequency resource was used for a previous transmission of the retransmitted code block or the retransmitted CBG.

11. The method according to claim 9, wherein the reference signal is used by the terminal device to determine channel state information; and
wherein the method further comprises:
when the third time-frequency resource does not carry the usable signal, receiving, by the network device, the channel state information and third indication information that are sent by the terminal device, wherein the third indication information indicates that the channel state information is invalid; or
when a ratio of a quantity of resource elements (REs) in the third time-frequency resource to a quantity of REs in the first time-frequency resource exceeds a first threshold, receiving, by the network device, the channel state information and the third indication information that are sent by the terminal device, wherein the third indication information indicates that the channel state information is invalid.

12. The method according to claim 11, wherein the channel state information is related to a first frequency domain resource, and wherein the first frequency domain resource has a bandwidth that is less than or equal to a system bandwidth.

13. The method according to claim 9, wherein the reference signal is used by the terminal device to determine channel state information; and
wherein the method further comprises:
when a ratio of a quantity of resource elements (REs) in the third time-frequency resource to a quantity of REs in the first time-frequency resource does not exceed a first threshold, receiving, by the network device, the channel state information sent by the terminal device, wherein the channel state information is obtained by using a signal carried in at least a part of the first time-frequency resource other than the third time-frequency resource; or
receiving, by the network device, the channel state information sent by the terminal device, wherein the channel state information is obtained by using a signal carried in at least a part of the first time-frequency resource other than the third time-frequency resource.

14. A terminal device, comprising:
at least one processor; and a non-transitory computer-readable storage medium coupled to the at least one processor and storing programming instructions for execution by the at least one processor, wherein the programming instructions, when executed by the at least one processor, cause the terminal device to:
receive first indication information sent by a network device, wherein the first indication information indicates a first time-frequency resource used to receive a reference signal transmitted to the terminal device;
receive second indication information sent by the network device, wherein the second indication information indicates a second time-frequency resource;
determine, according to the second indication information received by the terminal device, that the first time-frequency resource used to receive the reference signal comprises a third time-frequency resource that carries a signal unusable as the reference signal, when the third time-frequency resource is at least one of:
a time-frequency resource comprised in both of the first time-frequency resource and the second time-frequency resource,
a time-frequency resource adjacent to the second time-frequency resource,
a time-frequency resource that has a distance from the second time-frequency resource in a time domain less than a preset first interval, or
a time-frequency resource with a scheduled transmission that is related to a transmission in the second time-frequency resource; and
determine whether the reference signal received is valid for use based on the first time-frequency resource and the third time-frequency resource.

15. The terminal device according to claim 14, wherein the second indication information further:
indicates that a signal on the second time-frequency resource is unavailable, or
indicates a retransmitted code block or a retransmitted code block group (CBG), wherein the second time-frequency resource was used for a previous transmission of the retransmitted code block or the retransmitted CBG.

16. The terminal device according to claim 14, wherein the reference signal is used by the terminal device to determine channel state information; and
wherein the programming instructions, when executed by the at least one processor, further cause the terminal device to:
skip sending the channel state information to the network device when determining that the signal carried in the third time-frequency resource is not usable as the reference signal;
send the channel state information and third indication information to the network device when determining that the signal carried in the third time-frequency resource is not usable as the reference signal, wherein the third indication information indicates that the channel state information is invalid;
skip sending the channel state information to the network device when a ratio of a quantity of resource elements (REs) in the third time-frequency resource to a quantity of REs in the first time-frequency resource exceeds a first threshold; or
send the channel state information and the third indication information to the network device when the ratio of the quantity of REs in the third time-frequency resource to the quantity of REs in the first time-frequency resource exceeds the first threshold, wherein the third indication information indicates that the channel state information is invalid.

17. The terminal device according to claim 14, wherein the reference signal is used by the terminal device to determine channel state information; and
wherein the programming instructions, when executed by the at least one processor, further cause the terminal device to:
send the channel state information to the network device when a ratio of a quantity of resource elements (REs) in the third time-frequency resource to a quantity of REs in the first time-frequency resource does not exceed a first threshold, wherein the channel state information is obtained by using a signal carried in at least a part of the first time-frequency resource other than the third time-frequency resource; or
send the channel state information to the network device, wherein the channel state information is obtained by using a signal carried in at least a part of the first time-frequency resource other than the third time-frequency resource.

18. The terminal device according to claim 14, wherein the reference signal is used by the terminal device to demodulate at least one information block; and
wherein the programming instructions, when executed by the at least one processor, further cause the terminal device to:
when the signal carried in the third time-frequency resource is not usable as the reference signal, demodulate the at least one information block without using the signal carried in the third time-frequency resource or skip demodulating the at least one information block;
skip demodulating the at least one information block when a ratio of a quantity of REs in the third time-frequency resource to a quantity of REs in the first time-frequency resource exceeds a second threshold; or
when the ratio does not exceed the second threshold, demodulate the at least one information block by using a signal carried in at least a part of a time-frequency resource in the first time-frequency resource other than the third time-frequency resource.

19. The terminal device according to claim 18, wherein the reference signal comprises only a first demodulation reference signal, or the reference signal comprises the first demodulation reference signal and a second demodulation reference signal, wherein the first demodulation reference signal is a basic demodulation reference signal used to demodulate the at least one information block, and wherein the second demodulation reference signal is an additional demodulation reference signal used to demodulate the at least one information block.

20. The terminal device according to claim 14, wherein the reference signal is used by the terminal device to demodulate at least one information block, wherein the reference signal comprises a first demodulation reference signal and a second demodulation reference signal, wherein the first demodulation reference signal is a basic demodulation reference signal used to demodulate the at least one information block, wherein the second demodulation reference signal is an additional demodulation reference signal used to demodulate the at least one information block, wherein the first demodulation reference signal occupies a first part of the first time-frequency resource, and wherein the second demodulation reference signal occupies a second part of the first time-frequency resource; and wherein the programming instructions, when executed by the at least one processor, further cause the terminal device to:

when the third time-frequency resource is comprised in the first part, demodulate the at least one information block without using the signal on the third time-frequency resource or skip demodulating the at least one information block;

skip demodulating the at least one information block when a first ratio of a quantity of REs in a first intersection set between the third time-frequency resource and the first part to a quantity of REs in the first part exceeds a third threshold;

when the first ratio does not exceed the third threshold, demodulate the at least one information block by using a signal on at least a part of a time-frequency resource in the first part other than the first intersection set;

when a second ratio of a quantity of REs in a second intersection set between the third time-frequency resource and the second part to a quantity of REs in the second part exceeds a fourth threshold, demodulate the at least one information block without using the second demodulation reference signal;

when the second ratio does not exceed the fourth threshold, demodulate the at least one information block by using a signal on at least a part of a time-frequency resource in the second part other than the second intersection set; or when the third time-frequency resource is comprised in the second part, demodulate the at least one information block without using the signal on the third time-frequency resource or skip demodulating the at least one information block.

* * * * *